(12) United States Patent
Dayer et al.

(10) Patent No.: US 10,365,730 B2
(45) Date of Patent: Jul. 30, 2019

(54) INPUT DEVICE WITH TRACK BALL

(71) Applicant: Logitech Europe S.A., Lausanne (CH)

(72) Inventors: Christophe Dayer, Onex (CH); Craig Higgins, County Cork (IE); Lars Lauridsen, Lausanne (CH); Martin Gleeson, County Cork (IE); Sylvain Sauvage, La-Tour-de-Peliz (FR)

(73) Assignee: Logitech Europe S.A., Lausanne (CH)

( * ) Notice: Subject to any disclaimer, the term of this patent is extended or adjusted under 35 U.S.C. 154(b) by 98 days.

(21) Appl. No.: 15/619,233

(22) Filed: Jun. 9, 2017

(65) Prior Publication Data

US 2018/0356909 A1 Dec. 13, 2018

(51) Int. Cl.
*G06F 3/0354* (2013.01)

(52) U.S. Cl.
CPC ...... *G06F 3/03541* (2013.01); *G06F 3/03543* (2013.01); *G06F 3/03549* (2013.01)

(58) Field of Classification Search
CPC ............. G06F 3/03541; G06F 3/03543; G06F 3/03549
See application file for complete search history.

(56) References Cited

U.S. PATENT DOCUMENTS

| | | | | |
|---|---|---|---|---|
| 6,064,371 A | * | 5/2000 | Bunke | G06F 3/03543 345/157 |
| 6,129,318 A | * | 10/2000 | Paulse | A47B 21/0371 248/118.3 |
| 6,292,175 B1 | | 9/2001 | Sheehan et al. | |
| 6,492,975 B1 | * | 12/2002 | Weiss | G06F 3/03543 345/163 |
| 7,047,452 B2 | | 5/2006 | Sessa | |
| 7,671,838 B2 | | 3/2010 | Large | |
| 8,884,879 B2 | | 11/2014 | Lo | |
| 2005/0275621 A1 | * | 12/2005 | Saez | G06F 3/03543 345/156 |
| 2009/0213068 A1 | * | 8/2009 | Saez | G06F 3/03543 345/156 |
| 2010/0253627 A1 | * | 10/2010 | Atzmon | G06F 3/03543 345/163 |
| 2012/0081285 A1 | * | 4/2012 | Atzmon | G06F 3/0338 345/163 |
| 2013/0025506 A1 | * | 1/2013 | Brennan | A47B 21/0314 108/103 |
| 2015/0193023 A1 | * | 7/2015 | Odgers | G06F 3/03543 345/163 |
| 2016/0350594 A1 | * | 12/2016 | McDonald | G06K 9/00604 |

* cited by examiner

*Primary Examiner* — Ricardo Osorio
(74) *Attorney, Agent, or Firm* — Kilpatrick Townsend & Stockton LLP

(57) ABSTRACT

Certain embodiments include a computer mouse including a housing having a bottom surface and a trackball disposed in the housing, where the bottom surface of the housing includes a first planar region, a second planar region, and a spine both common to and dividing the first and second planar regions. The first and second planar regions can be on different planes, where, when in operation, the computer mouse is configured to rest on a work surface, when the computer mouse is configured such that the first planar region of the bottom surface is parallel to the work surface, the computer mouse is tilted at a first angle relative to the work surface, and when the computer mouse is configured such that the second planar region of the bottom surface is parallel to the work surface, the computer mouse is tilted at a second angle relative to the work surface.

18 Claims, 10 Drawing Sheets

INPUT DEVICE WITH TRACK BALL

BACKGROUND

Computer input devices are pervasive in modern culture and are typically used to convert human-induced analog inputs (e.g., touches, clicks, motions, touch gestures, button presses, scroll wheel rotations, etc.) made in conjunction with an input device into digital signals for computer processing. An input device can include any device that can provide data and control signals to a computing system. Some non-limiting examples of input devices include computer mice, trackballs, keyboards, remote controls, gaming controllers, joysticks, and the like. Some non-limiting examples of computing systems include desktop computer, laptop computers, tablet computers, smart phones, personal digital assistants (PDA), wearable devices (e.g., smart watches, glasses), and the like.

Computer mice are the most commonly used input devices, however there is a growing number of users that prefer trackball devices for a variety of reasons. For instance, trackball devices are typically stationary and require less battery power, as power intensive processes using motion sensors, accelerometers, and the like, are typically not included. Because trackball devices do not move, they require less surface space and can be used on virtually any surface. Some ergonomic advantages include reduced muscle fatigue over long term use (e.g., less movement in shoulder, arm, and wrist) and, in some cases, ambidextrous use. Despite these advantages, better ergonomic designs are needed.

BRIEF SUMMARY

In certain embodiments, a computer mouse includes a housing having a bottom surface and a trackball disposed in the housing, where the bottom surface of the housing can include a first planar region, a second planar region, and a spine both common to and dividing the first and second planar regions. The first and second planar regions can be on different planes. When in operation, the computer mouse can be configured to rest on a work surface. In some cases, the computer mouse can be configured such that when the first planar region of the bottom surface is parallel to the work surface, the computer mouse is tilted at a first angle relative to the work surface, and when the computer mouse is configured such that the second planar region of the bottom surface is parallel to the work surface, the computer mouse can be tilted at a second angle relative to the work surface. In some embodiments, when the computer mouse is configured such that the first planar region of the bottom surface is parallel to the work surface, the computer mouse can be tilted at zero degrees relative to the work surface, and when the computer mouse is configured such that the second planar region of the bottom surface is parallel to the work surface, the computer mouse can be tilted at 20-30 degrees relative to the work surface. In some cases, the computer mouse can incorporate a track ball controller.

In further embodiments, the computer mouse can include a platform coupled to the bottom surface of the housing, with the platform resting on the work surface. When the computer mouse is configured such that the first planar region of the bottom surface is parallel to the work surface, the first planar region may rest on and be flush against a first portion of the platform. When the computer mouse is configured such that the second planar region of the bottom surface is parallel to the work surface, the second planar region may rest on and be flush against a second portion of the platform. In some cases, the platform can remain on the work surface as the computer mouse pivots on the spine between the first angle and second angle relative to the work surface. In some aspects, the computer mouse can further include a first set of magnets disposed in the first planar region of the housing and a second set of magnets disposed in the second planar region of the housing, where the platform can be comprised of a metal. In such cases, the platform can be secured to the first planar region according to a first magnetic force provided by the first set of magnets when the computer mouse is at the first angle relative to the work surface, and the platform can be secured to the second planar region according to a second magnetic force provided by the second set of magnets when the computer mouse is at the second angle relative to the work surface. Some embodiments may employ a third set of magnets disposed in the first portion of the platform, the third set of magnets to magnetically couple to the first set of magnets when the computer mouse is at the first angle relative to the work surface. A fourth set of magnets can be disposed in the second portion of the platform, the fourth set of magnets to magnetically couple to the second set of magnets when the computer mouse is at the second angle relative to the work surface.

In certain embodiments, a computer mouse may include a coupling guide disposed along the spine of the bottom surface, the coupling guide to receive a protrusion extending from the platform, where the coupling guide can remain coupled to the protrusion of the platform as the computer mouse pivots on the spine between the first angle and second angle relative to the work surface. Some embodiments may include a hinge disposed along the spine of the bottom surface and hingeably coupled to the platform, where the platform remains hingeably coupled to the platform as the computer mouse pivots on the spine between the first angle and second angle relative to the work surface. The computer mouse can include a scroll wheel, where the spine and the scroll wheel can be linearly offset by 12-14 degrees, and in some cases, the spine can be configured to be linearly aligned a user's forearm when the user is using the computer mouse.

In some embodiments, a computer mouse includes a housing having a bottom surface and the bottom surface of the housing can include a first planar region, a second planar region, and a spine both common to and dividing the first and second planar regions. In some cases, the first and second planar regions can be on different planes, When in operation, the computer mouse can be configured to rest on a work surface, where when the computer mouse is configured such that the first planar region of the bottom surface is parallel to the work surface, the computer mouse can be tilted at a first angle relative to the work surface, and where when the computer mouse is configured such that the second planar region of the bottom surface is parallel to the work surface, the computer mouse can be tilted at a second angle relative to the work surface. In some cases, the spine can be configured to be linearly aligned a user's forearm when the user is using the computer mouse.

In some embodiments, when the computer mouse is configured such that the first planar region of the bottom surface is parallel to the work surface, the computer mouse can be tilted at zero degrees relative to the work surface, and when the computer mouse is configured such that the second planar region of the bottom surface is parallel to the work surface, the computer mouse can be tilted at 20-30 degrees relative to the work surface. In certain embodiments, the computer mouse can further include a platform coupled to the bottom surface of the housing, the platform to rest on the work surface, where when the computer mouse is configured such that the first planar region of the bottom surface is parallel to the work surface, the first planar region can rest on and be flush against a first portion of the platform, and when the computer mouse is configured such that the second planar region of the bottom surface is parallel to the work surface, the second planar region can rest on and be flush against a second portion of the platform. The platform may remain on the work surface as the computer mouse pivots on the spine between the first angle and second angle relative to the work surface.

In further embodiments, the computer mouse can include a first set of magnets disposed in the first planar region of the housing and a second set of magnets disposed in the second planar region of the housing, where the platform can be comprised of a metal. In some cases, the platform can be secured to the first planar region according to a first magnetic force provided by the first set of magnets when the computer mouse is at the first angle relative to the work surface, and the platform can be secured to the second planar region according to a second magnetic force provided by the second set of magnets when the computer mouse is at the second angle relative to the work surface. The computer mouse can include a trackball and/or a scroll wheel where the spine and the scroll wheel can be linearly offset by 12-14 degrees, and the spine can be configured to be linearly aligned a user's forearm when the user is using the computer mouse.

In some embodiments, a computer mouse includes a housing having a bottom surface and a platform coupled to the bottom surface of the housing, the platform to rest on a work surface, and the platform including a first portion and a second portion, where the bottom surface of the housing can include a first planar region, a second planar region, and a spine both common to and dividing the first and second planar regions. The first and second planar regions can be on different planes. When the computer mouse is configured such that the first planar region of the bottom surface is parallel to the work surface, the computer mouse can be tilted at a first angle relative to the work surface and the first planar region can rest on and be flush against the first portion of the platform, and when the computer mouse is configured such that the second planar region of the bottom surface is parallel to the work surface, the computer mouse can be tilted at a second angle relative to the work surface and the second planar region can rest on and be flush against the second portion of the platform. In some cases, the platform can remain on the work surface as the computer mouse pivots on the spine between the first angle and second angle relative to the work surface. In some cases, when the computer mouse is configured such that the first planar region of the bottom surface is parallel to the work surface, the computer mouse can be tilted at zero degrees relative to the work surface, and when the computer mouse is configured such that the second planar region of the bottom surface is parallel to the work surface, the computer mouse can be tilted at 20-30 degrees relative to the work surface.

In certain implementations, the computer mouse can include a first set of magnets disposed in the first planar region of the housing and a second set of magnets disposed in the second planar region of the housing, where the platform may be comprised of a metal. The platform can be secured to the first planar region according to a first magnetic force provided by the first set of magnets when the computer mouse is at the first angle relative to the work surface, and the platform can be secured to the second planar region according to a second magnetic force provided by the second set of magnets when the computer mouse is at the second angle relative to the work surface. The computer mouse may include a coupling guide disposed along the spine of the bottom surface, the coupling guide to receive a portion of the platform, where the platform may remain coupled to the portion of the platform as the computer mouse pivots on the spine between the first angle and second angle relative to the work surface. In some cases, the computer mouse may incorporate a track ball.

BRIEF DESCRIPTION OF THE DRAWINGS

The detailed description is set forth with reference to the accompanying figures.

DETAILED DESCRIPTION

Embodiments of this invention are generally directed to input devices. More specifically, certain embodiments relate to an adjustable computer input device with a trackball.

In the following description, for purposes of explanation, numerous examples and details are set forth in order to provide an understanding of embodiments of the present invention. It will be evident, however, to one skilled in the art that certain embodiments can be practiced without some of these details, or can be practiced with modifications or equivalents thereof.

In some embodiments, an input device (e.g., computer mouse) can include a trackball and may be adjustable to accommodate different hand positions to improve ergonomic performance. A bottom surface of the input device rests on a work surface and can be wedge-shaped to include a first and second planar region on different planes divided by a common spine. The input device can be configured to rest on the first planar region to configure the input device at a first angle relative to the surface (e.g., a zero degree angle) or tilted such that the input device rests on the second planar region to configure the input device at an incline (e.g., 20 degree angle) to reduce strain on a user's wrist. The input device can include a platform that can function as an interface between the bottom surface of the input device and a work surface, as shown, for example, in FIGS. 4A and 4B, which are further discussed below. For instance, the platform may be coupled to the bottom surface of the input device by magnets (e.g., see FIG. 3), a hinge (e.g., see FIG. 5), a frictional fit, or the like, such that the first planar region or the second planar region rests on the platform to configure the input device at different inclines with respect to the work surface. In some cases, a user can tilt the input device back and forth between the first and second planar regions on the platform along the spine. Some embodiments include further ergonomic enhancements including the spine and scroll wheel being offset by a preferred distance (e.g., 12-14 degrees) and the spine separating the first and second planar regions being linearly aligned with a user's forearm, which can reduce muscle fatigue and certain repetitive use injuries. One of ordinary skill in the art would understand the many variations, modifications, and alternative embodiments thereof, and some of these are presented in the following description and accompanying figures.

Figure 1A:
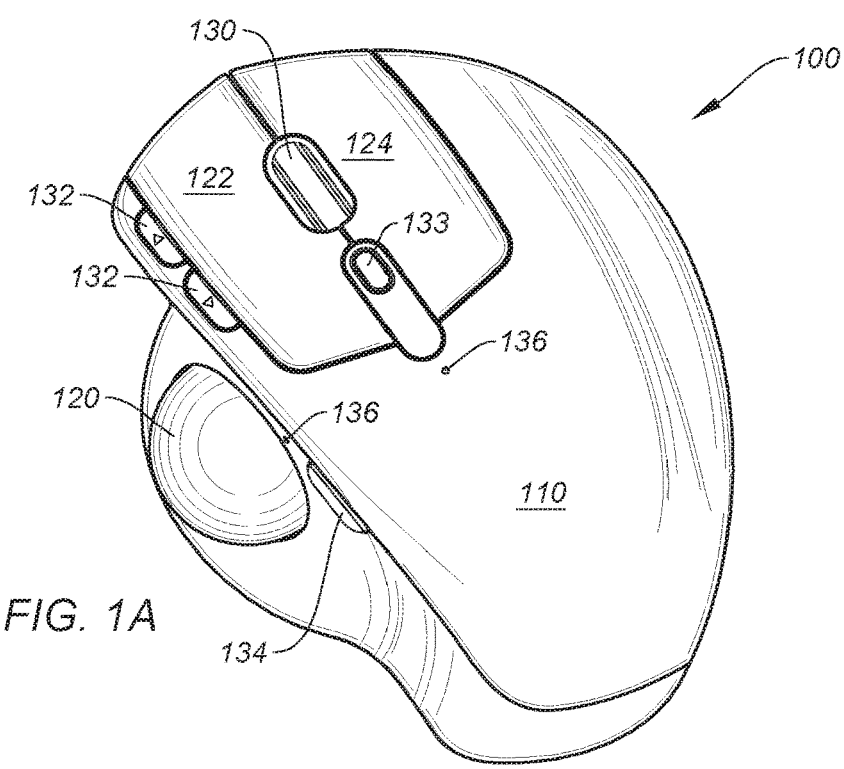
FIG. 1A shows an adjustable computer input device with a trackball, according to certain embodiments.

FIG. 1A shows an adjustable computer input device 100 with a trackball, according to certain embodiments. Input device 100 can include housing 110, trackball 120, scroll wheel 130, left button 122, right button 124, back/forward buttons 132 (also referred to as "side" buttons 132, or simply "buttons 132"), host selection button 133, precision tracking button 134, light emitting diodes (LED)s 136, and platform 140 (not shown in this view). Housing 110 can be a chassis, which can house, support, and contain some or all of the components of input device 100 and function as the primary user interface to support a user's hand and contact a work surface (directly or indirectly through platform 140), as would be understood by one of ordinary skill in the art. Many of the embodiments described herein refer to an input device. It should be understood that except when referring to "conventional" computer mice and the like, an input device as described in the embodiments through this disclosure can include a computer mouse with a track ball, a computer mouse, a computer input device, a track ball device, or the like.

Trackball 120 can incorporate any suitable trackball tracking technology including mechanical tracking systems, optical tracking systems, infra-red (IR) tracking systems, laser tracking systems, and the like. Mechanical tracking systems can include a track ball supported by two or more perpendicular encoding shafts and a third support bearing track physically track the movement of the ball and translate that movement to, e.g., a movement of a cursor on a digital display (e.g., computer monitor). Optical and IR tracking systems can use various LEDs (e.g., red, IR, etc.) that can bounce light off of the trackball surface onto a complementary metal oxide semiconductor (CMOS) sensor (or other suitable sensor) to track movement of the trackball. Optical and IR sensors can have no moving parts other than the trackball. Such systems may employ other elements including trackball retaining hardware, one or more lenses, and the like. Laser tracking systems may employ a laser diode that generates a beam of light that can be focused on the track ball surface, which reflects the light back to a sensor where movement is calculated. One of ordinary skill in the art would understand the many variations, modifications, and alternative embodiments thereof.

Scroll wheel 130 can include any suitable functionality including, but not limited to, free-wheel scrolling, ratcheted scrolling, clutched scrolling, tilt functions, click capabilities (e.g., depressible to contact a sensor to register a "button press") and the like. Left and right buttons 122, 124, can include separate key plates or may be integrated with the housing, as discussed in U.S. patent application Ser. No. 15/453,744, which is incorporated by reference in its entirety for all purposes. Any number of buttons, touch sensors, or other user interface elements can be incorporated into input device 100. For instance, some embodiments can include one-dimensional touch-sensitive sliders or two-dimensional touch-sensitive touch pads. Buttons 132 may be preset to particular functions (e.g., back/forward, next webpage, previous webpage, etc.) or can be user assignable to any suitable function.

Host selection buttons 133 can be used to switch between multiple operating systems and cross platforms operating on multiple host computing devices. For example, input device 100 can be wirelessly paired to a first host computing device running a Microsoft® operating system and a second host computing device running a Mac OS® operating system, where host selection button 133 causes input device 100 to switch control between the first and second host devices. This is further discussed in application Ser. No. 14/884,381, which is incorporated by reference in their entirety for all purposes. In some embodiments, input device 100 can be "flow enabled," as described in U.S. patent application Ser. No. 15/226,770, which is hereby incorporated by reference in its entirety for all purposes. Precision tracking button 134 (or "button 134") can be configured to enhance track ball tracking by changing the tracking speed of the sensor for increased dots-per-inch (DPI) capabilities, which can be advantageous for certain applications. LEDs 136 can be assigned to illuminate for any suitable purpose, including indicating host switching, DPI settings, charging indicators, or the like. Input device 100 can connect to one or more host computing devices using any suitable wireless connectivity including Bluetooth®, Bluetooth Low Energy (BLE)®, Logitech Unifying®, ZigBee®, Z-Wave®, IR, or other suitable radio frequency (RF), as would be understood by one of ordinary skill in the art.

Figure 1B:
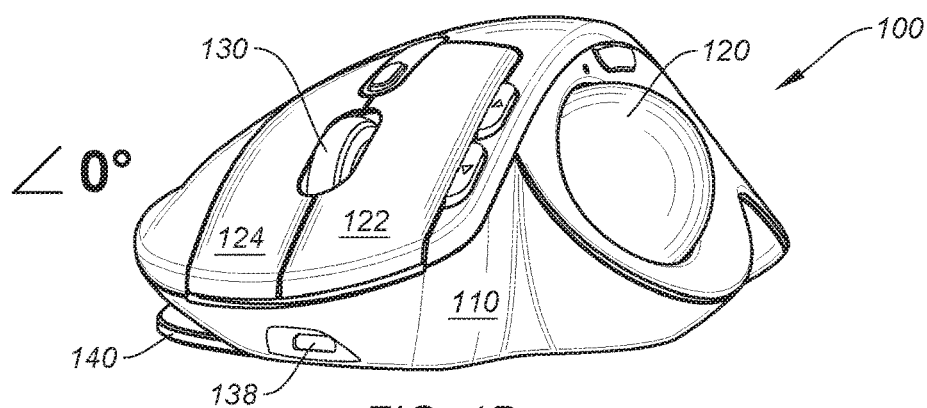
FIG. 1B shows an adjustable computer input device with a trackball, according to certain embodiments.
Figure 1C:
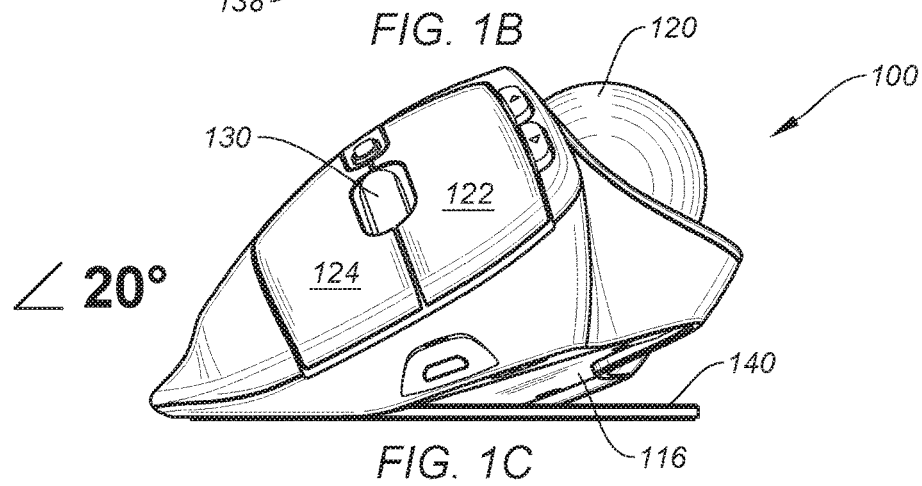
FIG. 1C shows an adjustable computer input device with a trackball, according to certain embodiments.

FIG. 1B shows an adjustable computer input device 100 with a trackball shown in a neutral configuration, according to certain embodiments. Platform 140 and charging port 138 are viewable from this perspective view. Charging port 138 can be an interface to charge one or more energy storage devices (e.g., batteries) disposed in housing 110, a data port to communicate with a host computing device (e.g., laptop, desktop, tablet computer, etc.), or a combination thereof, via a hardwired coupling means (e.g., USB type A-C, mini-USB, micro-USB, USB 3, FireWire, Lightning® or Thunderbolt® connectors, etc.). Platform 140 supports the bottom of input device 10 that includes first planar region 314 and second planar region 316, as shown and described below, at least with respect to FIG. 3. Referring back to FIG. 1B, Input device 100 is configured such that second planar region 316 of the bottom portion of housing 110 is resting on platform 140, causing input device 100 to incline at 0 degrees from the work surface it is resting on. FIG. 1C shown input device 100 configured such that first planar region 314 of the bottom portion of housing 110 is resting on platform 140, causing input device 100 to incline at 20 degrees from the work surface it is resting on. In some embodiments, other angles can be implemented. For instance, the bottom surface (e.g., first planar region 314) can be contoured such that input device 100 in inclined at a lower angle (e.g., 5-15 degrees, and higher angle (e.g., 25, 30, 35 degrees, etc.) or the like. One of ordinary skill in the art with the benefit of this disclosure would understand the many variations, modifications, and alternative embodiments thereof.

The various examples, description, and corresponding figures described throughout this document may refer generically to host computing devices without explicitly stating a type (e.g., laptop computer). It should be understood that a host computer can be any suitable computing device including, but not limited to, a desktop computer, a laptop computer, a tablet or "phablet" computer, a smart phone, a personal digital assistant, a wearable devices (e.g., smart watches, smart glasses), a smart appliance, a vehicle, or any other suitable computing apparatus. A host computer may include a machine readable medium (not shown) that is configured to store computer code, such as mouse driver software, where the computer code is executable by a processor (see, e.g., processor 210) to control aspects of the host computer via input device 110.

In some embodiments, input device 100 can be configured to provide control signals for movement tracking (e.g., x-y movements based on manual trackball manipulations), touch and/or gesture detection (e.g., on touch sensitive portions of input device 100), orientation detection, power management capabilities, input detection (e.g., buttons, scroll wheels, etc.), output functions (e.g., LED control, haptic feedback, etc.), or any of a myriad of additional features that would be understood by one of ordinary skill in the art.

Figure 2:
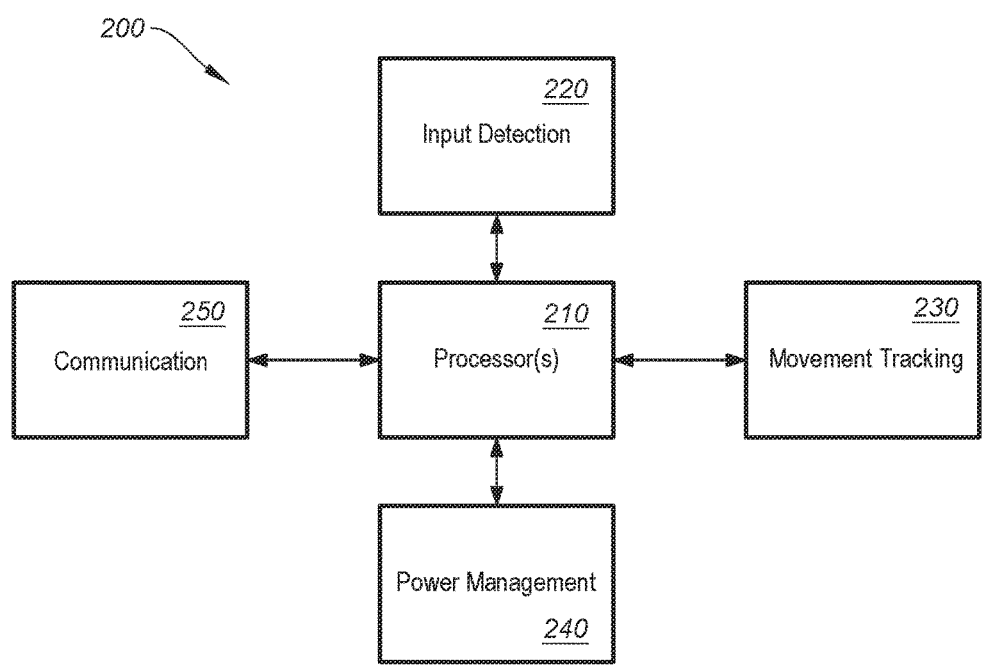
FIG. 2 shows a simplified block diagram of a system to operate a computer input device, according to certain embodiments.

FIG. 2 shows a simplified block diagram of a system 200 to operate input device 100, according to certain embodiments. System 200 may include processor(s) 210, input detection block 220, movement tracking block 230, power management block 240, and communication block 250. Each of system blocks 220-250 can be in electrical communication with processor 210. System 200 may further include additional systems that are not shown or discussed to prevent obfuscation of the novel features described herein.

In certain embodiments, processor(s) 210 may include one or more microprocessors (μCs) and can be configured to control the operation of system 200. Alternatively, processor 210 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, μCs, DSPs, and the like, may be configured in other system blocks of system 200. For example, communications block 250 may include a local processor to control communication with a host computing device (e.g., via Bluetooth, Bluetooth LE, RF, IR, hardwire, ZigBee, Z-Wave, Logitech Unifying, or other communication protocol). In some embodiments, multiple processors may enable increased performance characteristics in system 200 (e.g., speed and bandwidth). It should be noted that although multiple processors may improve system performance, they are not required, nor germane to the operation of the embodiments described herein.

In some aspects, input detection block 220 can control the detection of button activation (e.g., left/right or "main" buttons 122, 124; buttons 132, 134; scroll wheel 130, etc.), scroll wheel and/or trackball manipulation (e.g., rotation detection), sliders, switches, touch sensors (e.g., one and/or two-dimensional touch pads), and the like. In some embodiments, input detection block 220 can detect when a key plate, button, scroll wheel, etc., is depressed with a sufficient force such that it contacts and activates a force sensor (e.g., actuator). The force sensor may generate a corresponding control signal (e.g., human interface device (HID) signal) to control a host computing device communicatively coupled to input device 100 (e.g., instantiating a "left click" on the computer). Alternatively, the functions of input detection block 220 can be subsumed by processor 210, or in combination therewith.

In some embodiments, input detection block 220 can detect a touch or touch gesture on one or more touch sensitive surfaces on input device 100. Input detection block 220 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of input device 100 may or may not utilize touch detection or touch sensing capabilities.

Input detection block 220 can include touch and/or proximity sensing capabilities.

Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., IR light barriers matrix, laser-based diode coupled with photo-detectors that measures the time of flight of the light path, etc.), acoustic sensors (e.g., piezo-buzzer coupled with some microphones to detect the modification of the wave propagation pattern related to touch points, etc.), or the like.

Movement tracking block 230 can be configured to track a movement of trackball 120 on input device 100. In some embodiments, movement tracking block 230 can track a movement of trackball 120 via any suitable tracking system including, but not limited to, mechanical tracking systems, optical tracking systems, IR tracking systems, laser tracking systems, and the like, as further discussed above with respect to FIG. 1A. In alternative embodiments, input device 100 may also be moveable with additional movement tracking hardware to track a movement of input device 100 along an underlying work surface. In such embodiments, movement tracking block 230 can use optical sensors such as LEDs or an imaging array of photodiodes to detect a movement of input device 100 relative to the underlying surface. Input device 100 may optionally include movement tracking hardware that utilizes coherent (laser) light. In certain embodiments, one or more optical sensors are disposed on the bottom side of input device 100 (not shown). Movement tracking block 230 can provide positional data (e.g., X-Y coordinate data) or lift detection data. For example, an optical sensor can detect when a user lifts input device 100 off of a work surface and can send that data to processor 210 for further processing.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers (e.g., in a "3D air mouse." Accelerometers can further determine if input device 130 has been lifted off of a surface and provide movement data that may include the velocity, physical orientation, and acceleration of input device 100. In some embodiments, gyroscope(s) can be used in lieu of or in conjunction with accelerometer(s) to determine movement or input device orientation.

Figures 4A, 4B:
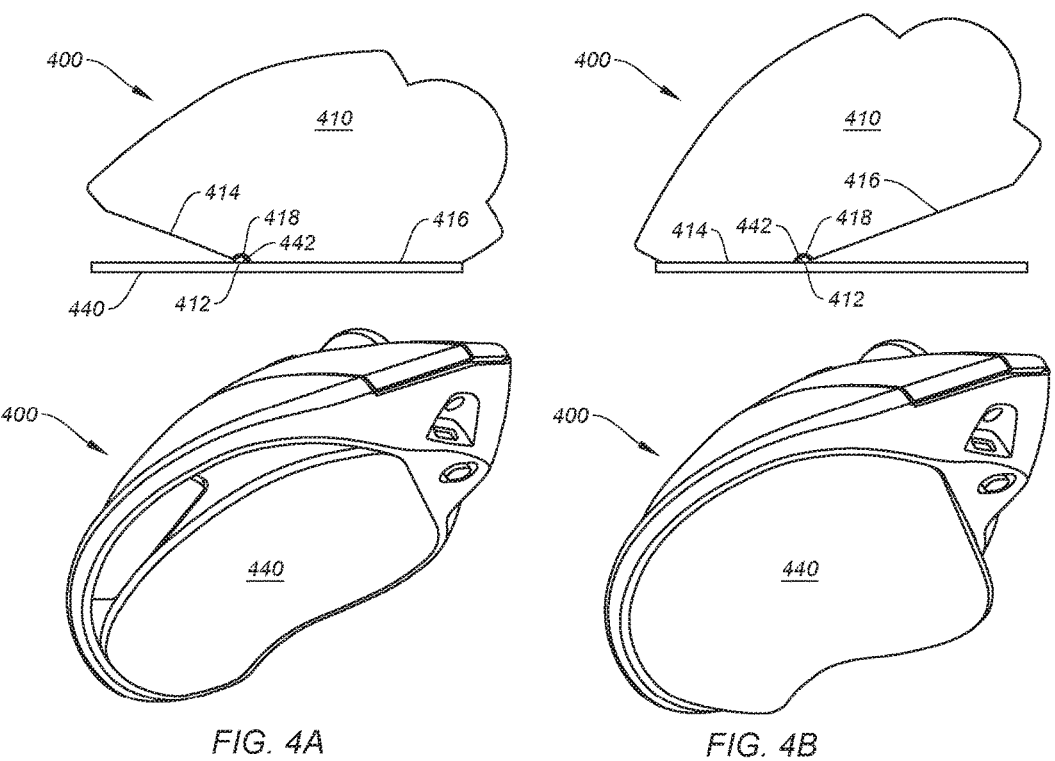
FIG. 4A shows an input device arranged in a neutral configuration, according to certain embodiments.
FIG. 4B shows an input device arranged in an inclined configuration, according to certain embodiments.

In some embodiments, one or more accelerometers and/or gyroscopes may be incorporated into input device 100 to detect when input device 100 is configured in a neutral configuration (see, e.g., FIG. 4A) or an inclined configuration (see, e.g., FIG. 4B). This may be useful, for example, to notify a user that they may want to switch from a neutral to an inclined configuration to reduce wrist strain after extended usage (e.g., over 1 hour of use). In some cases, notification can be performed via software operating on a display of the host computing device, by a sound, LED, haptic feedback, or other feedback mechanism on input device 100, or a combination thereof. Touch detection (e.g., capacitive sensing), biometrics, or supplementation with other devices (e.g., webcam) may be used to detect when a user is engaging the input device to determine time of use and whether a recommendation to switch orientations (between neutral and inclined orientations) is recommended. One of ordinary skill in the art would understand the many variations, modifications, and alternative embodiments thereof.

Power management block 240 can be configured to manage power distribution, recharging, power efficiency, and the like, for input device 100. In some embodiments, power management block 240 can include a battery (not shown), a USB based recharging system for the battery (not shown), power management devices (e.g., low-dropout voltage regulators—not shown), and a power grid within system 200 to provide power to each subsystem (e.g., communications block 250, etc.). In certain embodiments, the functions provided by power management block 240 may be incorporated into processor(s) 210. Alternatively, some embodiments may not include a dedicated power management block. For example, functional aspects of power management block 240 may be subsumed by another block (e.g., processor(s) 210) or in combination therewith.

Communications block 250 can be configured to provide communication capabilities with a host computing device, or other devices and/or peripherals, according to certain embodiments. Communications block 250 can be configured to provide wireless connectivity (e.g., radio-frequency (RF), Bluetooth, BLE, IR, ZigBee, Z-Wave, Logitech Unifying, or the like) to a host computer or other wireless devices. System 200 may include a hardwired connection to the host computer (e.g., USB, FireWire, etc.). For example, input device 100 can be configured to receive a Universal Serial Bus (USB) cable to enable bi-directional electronic communication with the host computer or other external devices. Some embodiments may utilize different types of cables or connection protocol standards to establish hardwired communication with other entities.

Although certain systems may not expressly discussed, they should be considered as part of system 200, as would be understood by one of ordinary skill in the art. For example, system 200 may include a bus system to transfer power and/or data to and from the different systems therein. In some embodiments, system 200 may include a storage subsystem (not shown). A storage subsystem can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein.

It should be appreciated that system 200 is meant to be illustrative and that many variations and modifications are possible, as would be appreciated by one of ordinary skill in the art. System 200 can include other functions or capabilities that are not specifically described here (e.g., mobile phone, global positioning system (GPS), power management, one or more cameras, various connection ports for connecting external devices or accessories, etc.). While system 200 is described with reference to particular blocks (e.g., input detection block 220), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Embodiments of the present invention can be realized in a variety of apparatuses including electronic devices implemented using any combination of circuitry and software. Furthermore, aspects and/or portions of system 200 may be combined with or operated by other sub-systems as informed by design. For example, power management 240 may be integrated with processor(s) 210 instead of functioning as a separate entity.

Figure 3:
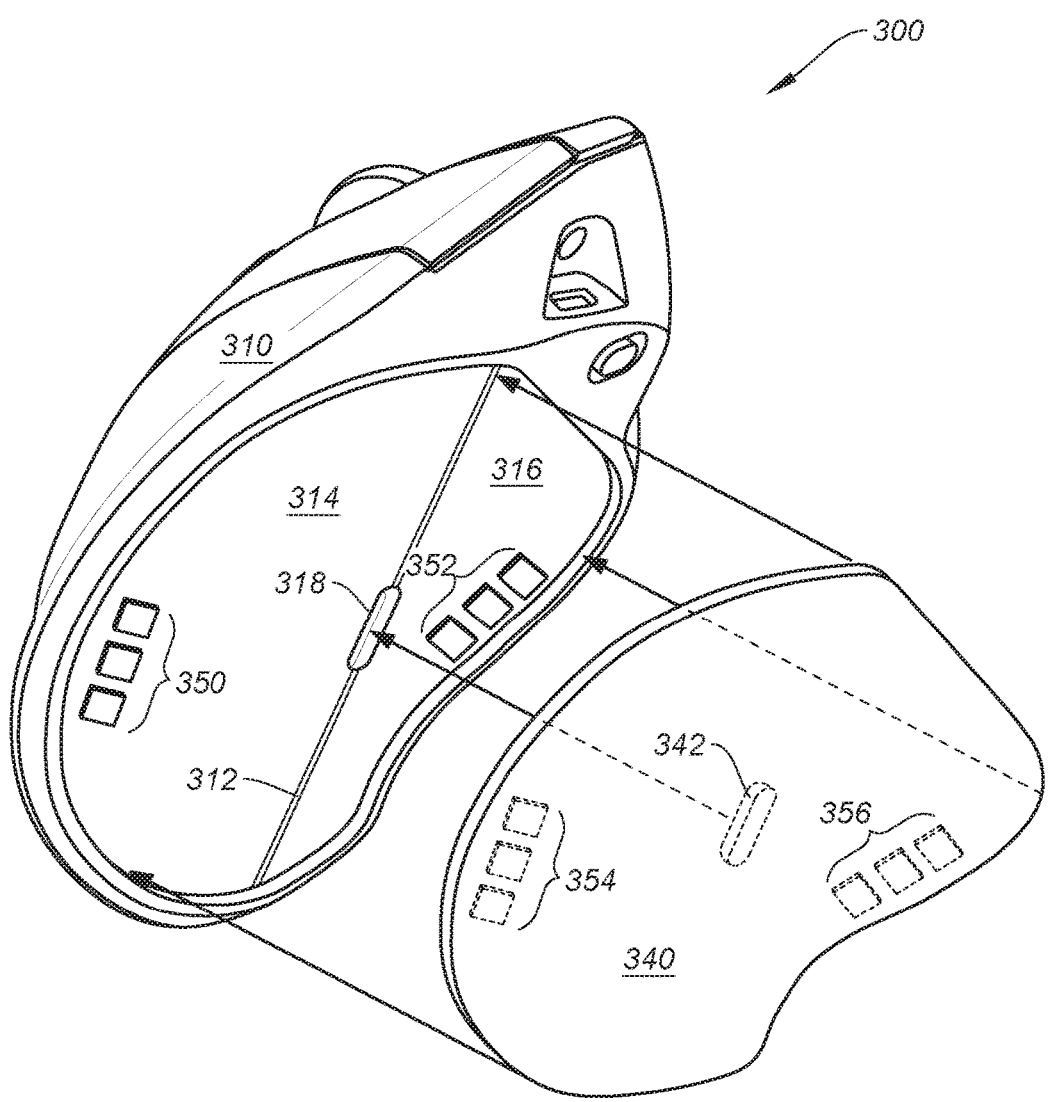
FIG. 3 shows aspects of the multi-planar bottom surface and platform structure, according to certain embodiments.

FIG. 3 shows aspects of the multi-planar bottom surface and platform structure, according to certain embodiments. Input device 300 can include housing 310 and a bottom surface of housing 310 including a first planar region 314, second planar region 316, a spine 312 that is both common to and divides first and second planar regions 314, 316. Platform 340 is configured to couple to one of the first and second planar regions depending on the configuration of input device 300. For instance, when in a neutral configuration, second planar region 316 couples to platform 340, as shown in FIG. 4A. When in an inclined configuration, first planar region 314 couples to platform 340, as shown in FIG. 4B. As such, first planar region 314 can be on a different plane than second planar region 316 in order to achieve the different inclinations of input device 300.

In some aspects, spine 312 can include coupling guide 318 disposed thereon to receive a portion 342 of platform 340, which can be referred to as protrusion 342. Coupling guide 318 can be used to help align platform 340 on the bottom surface of input device 300. For example, configuring protrusion 342 to fit inside coupling guide 318 may cause platform 340 to be properly aligned with the bottom portion of the housing defined by first and second planar regions 314, 316. In some cases, coupling guide 318 remains coupled to protrusion 342 of platform 340 as input device 300 pivots on the spine between the first and second planar regions 314, 316, as shown in FIGS. 4A-4B. First planar region 314 may correspond to a first angle relative to the work surface (e.g., 20 degrees) and second planar region 316 can correspond to a second angle relative to the work surface (e.g., 0 degrees). Platform 340 may be comprised of a metal (e.g., steel, nickel, or other ferromagnetic metal), plastic, or other suitable compound. In some cases, coupling guide 318 may be an indentation along spine 312.

Some embodiments may further include magnets 350 on first platform 314 and magnets 352 on second platform 316 to magnetically couple to a platform comprised of a ferromagnetic material (e.g., steel). In some aspects, for instance with a platform comprised of a non-ferromagnetic material (e.g., aluminum, plastic, etc.), additional magnets can be used to magnetically couple to the magnets on bottom surface of input device 300. For example, magnets 354 can be embedded in platform 340 at a location such that they magnetically couple to magnets 350 of first planar region 314 when input device 300 is placed in the inclined configuration (e.g., inclined at 20 degrees). Likewise, magnets 356 can be embedded in platform 340 at a location such that they magnetically couple to magnets 532 of second planar region 316 when input device 300 is placed in the neutral configuration (e.g., inclined at 0 degrees). Magnets 350, 352, 354, 356 can each be a single magnet or a set of magnets (e.g., multiple magnets).

The magnets can be used to increase a holding force (magnetic force) between platform 340 and the bottom of input device 300 (i.e., first/second planar regions 314/316), such that a user resting their hand on input device 300 during use would not inadvertently cause a switch between neutral and inclined configurations. That is, the weight of the user's hand during normal use typically would not provide enough force to switch configurations, according to certain embodiments. As such, the user would have to add additional force to cause input device 300 to pivot between configurations. The amount of force needed to switch between the neutral and inclined configurations can depend on the number of magnets used, their location on input device and/or platform 340 (e.g., the farther away from spine 312 that magnets 350/352 are disposed, the greater the force required to break the magnetic coupling between the magnets and platform). In some embodiments, the number of magnets and/or location of the magnets are engineered such that a force of approximately 700 g toward one side of input device 300 or the other causes input device 300 to switch from one configuration (e.g., neutral configuration) to the other (e.g., inclined configuration). Research has shown that breaking the magnetic bond between the magnets and platform to switch from one configuration to the other is preferably around 650-750 g. In embodiments where the magnetic bond is approximately 400-500 g, the user experience tends to feel too easy to switch, which can result in inadvertent shifts between configurations. In embodiments where the magnetic bond (i.e., strength of magnets to platform bond) is approximately 800-900 g, the user experience tends to feel too difficult (too much effort required) to make a transitions between configurations. The weight of an average-sized hand provides approximately 200-300 g of force (typically ~250 g) so some exemplary implementations may be configured to receive an additional 400 g (for a total of 700 g) before the magnetic bond is overcome. One of ordinary skill in the art would understand the many variations, modifications, and alternative embodiments thereof.

Alternatively or additionally, other coupling means can be used to couple the bottom of housing 310 to platform 340. For instance, certain reusable adhesives (e.g., glue, rubber, tape, etc.) may be used on the bottom surface of housing 310 (e.g., on first/second planar regions 314, 316), on platform 340, or both. Some embodiments may employ hardware such as a quick release tab to secure and release a coupling between platform 340 and one of the first or second planar regions 314, 316 at a time. In some cases, a friction fit (e.g., between protrusion 342 and coupling guide 318 may provide enough frictional force to keep input device in a current configuration (e.g., neutral or inclined configuration) during normal use (e.g., when a user is resting their hand on input device 300). In certain implementations, a hinge can be used (e.g., along spine 312) for a more permanent coupling between platform 340 and housing 310, while still allowing input device 300 to pivot between configuration. A hinge may further provide a sufficient friction such that any number of inclines for input device 300 can be achieved as the friction may be strong enough to hold input device 300 in place under normal operation use (e.g., under the weight of a user's hand), as further described below with respect to FIG. 5. In alternative embodiments, three planar regions can be employed. For example, a middle planar region can provide a third angle relative to the work surface, such that input device 300 can be configured at three different inclines (e.g., 0 degrees, 20 degrees, and 30 degrees). One of ordinary skill in the art would understand the many variations, modifications, and alternative embodiments thereof. It should be noted that input device 300 can incorporate some or all of the features (e.g., scroll wheel 130, buttons 122, 124, etc.) and operational characteristics (e.g., pivoting between neutral and inclined configurations) of input device 100, or any of the other input devices described throughout this disclosure (e.g., from FIGS. 1A-9) and vice versa, such that one of ordinary skill in the art would understand any of the inventive concepts shown and described in the figures and disclosure can be mixed and matched accordingly.

FIG. 4A shows input device 400 arranged in a neutral configuration, according to certain embodiments. Input device 400 is shown as a simplified silhouette in the upper figure to depict how housing 410 is configured with respect to platform 440 and an underlying work surface. The lower figure presents a more visually detailed representation to illustrate a different view of the relationship between platform 440 and housing 410. Referring to the silhouette view, platform 440 can couple to the bottom portion of housing 410 at second planar region 416, placing input device 400 in a neutral configuration. That is, second planar region 416 rests on and is flush against a portion of platform 440 and configured to be parallel to the work surface. Spine 412, as discussed above, can be a pivot point as housing 410 pivots between the neutral and inclined configurations. Spine 412 may include coupling guide 418 to receive protrusion 442, which can be used to properly align platform 440 with the bottom of housing 410 in either configuration, as further discussed above with respect to FIG. 3. In some embodiments, protrusion 442 and coupling guide 418 may be excluded. Referring to the lower figure of FIG. 4A, second planar region 416 is coupled to platform 440 such that input device 400 is placed in a neutral configuration (e.g., zero degree angle with respect to platform 440 and/or the underlying work surface), and a portion of platform 440 does not contact first planar region 414, which can expose an underside of housing 410 (i.e., first planar region 414).

FIG. 4B shows input device 400 arranged in an inclined configuration, according to certain embodiments. Similar to FIG. 4A, input device 400 is shown as a simplified silhouette in the upper figure of FIG. 4B to depict how housing 410 is configured with respect to platform 440 and an underlying work surface. The lower figure of FIG. 4B presents a more visually detailed representation to illustrate a different view of the relationship between platform 440 and housing 410. Referring to the silhouette view of FIG. 4B, platform 440 can couple to the bottom portion of housing 410 at first planar region 414, placing input device 400 in an inclined configuration. That is, first planar region 414 rests on and is flush against a portion of platform 440 and configured to be parallel to the work surface. Spine 412, as discussed above, may include coupling guide 418 to receive protrusion 442, which can be used to properly align platform 440 with the bottom of housing 410 in either configuration. In some embodiments, protrusion 442 and coupling guide 418 may be excluded. Referring to the lower figure of FIG. 4B, first planar region 414 is coupled to platform 440 such that input device 400 is placed in an inclined configuration (e.g., 20 degree angle with respect to platform 440 and/or the underlying work surface), and a portion of platform 440 does not contact second planar region 416, which can expose an underside of housing 410 (i.e., second planar region 416). It should be noted that although 0 and 20 degree inclines are described in the various embodiments herein, it would be understood by one of ordinary skill in the art with the benefit of this disclosure other designs having different inclines (e.g., 0-30 degrees) are possible.

Figure 5:
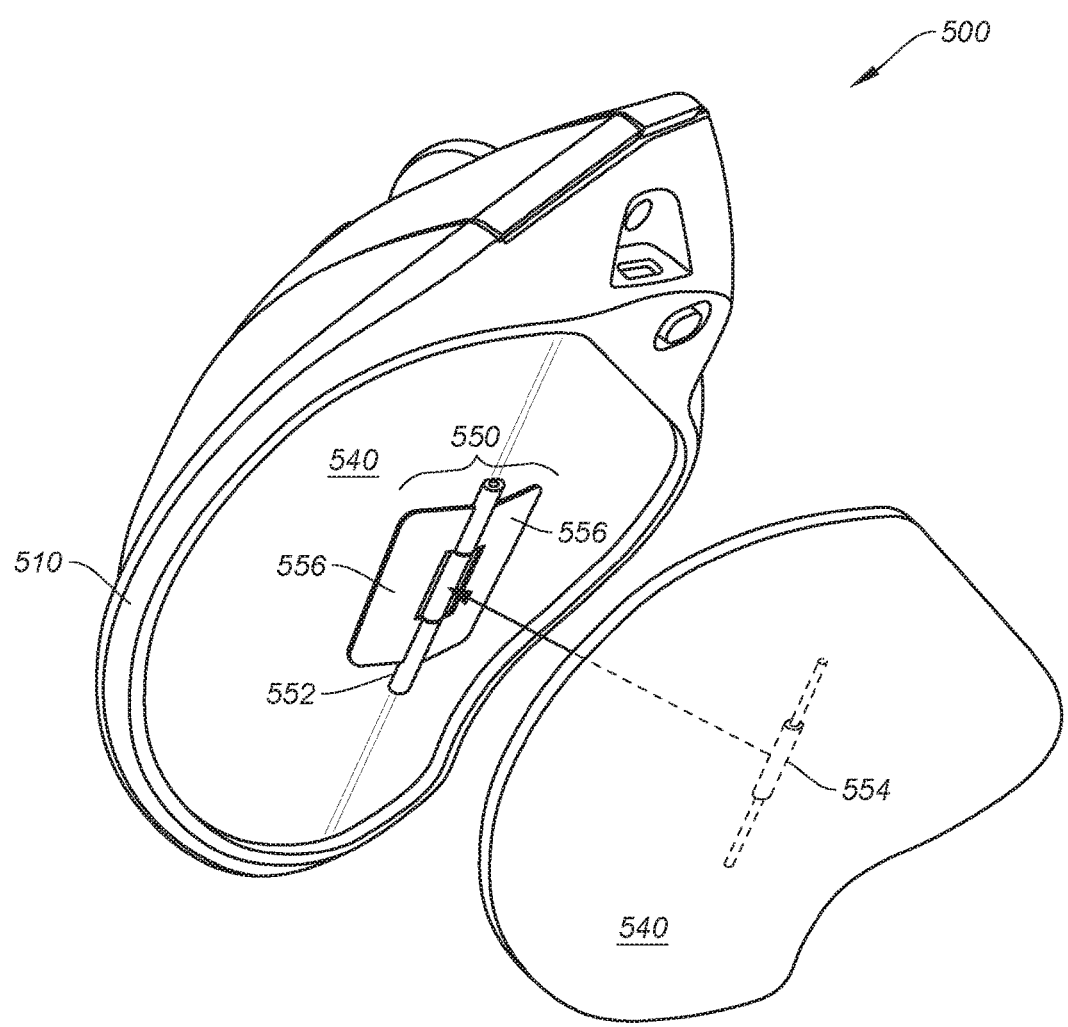
FIG. 5 shows an adjustable input device with an hinge structure and track ball, according to certain embodiments.

FIG. 5 shows an adjustable input device 500 with a hinge structure 550 and track ball, according to certain embodiments. Input device 500 may be similar to input devices 100, 300, and 400, but for the addition of hinge structure 550 along the spine of the underside of housing 510. Hinge structure 550 can be configured to affix platform 540 to the bottom side of housing 510, but still allow platform 540 to rotate (pivot) freely (or with resistance) between neutral and inclined configurations, as discussed above (that is, platform 540 can be hingeably coupled to the spine). Hinge structure 550 may include flanges 556 that couple hinge structure 550 to housing 510 (e.g., via screws, pins, etc.), barrel portion 552, and a rotatable portion 554 rotatably coupled to barrel portion 552 and fixedly coupled to platform 540, as shown in FIG. 5. In some cases, hinge structure 550 may provide a frictional resistance to rotation that may be greater than an amount of force provided by a user resting their hand on input device 500 to prevent inadvertent pivoting between neutral and inclined configurations. In some aspects, the frictional force may also be low enough such that a user can switch between configurations without excessive effort. For example, the frictional force can be configured such that a user needs to provide a total of about 700 g of force to cause the device to switch configuration (note that the typical hand provides 250 g of force, so the additional perceived force by the user may be closer to 450 g, as would be understood by one of ordinary skill in the art). Thus, input device 500 may be configurable at many different inclines as the frictional resistance to rotation may be high enough to accommodate the weight of a user's hand at any incline from 0 degrees to 20 degrees (or more, depending on the incline of the underlying planar regions). Hinge structure 550 may be embedded in housing 510 (e.g., not protruding) such that platform 540 can still be flush against the bottom of housing 510 (i.e., against the first or second planar regions). In some embodiments, magnets, adhesives, mechanical latches/releases, etc., may be employed, as discussed above with respect to FIG. 3.

Ergonomic Advantages

Poor posture has been identified as one of the key risk factors for Repetitive Strain Injury (RSI). One goal of ergonomics is to configure interface devices, work stations, etc., toward more natural postures and body orientations. A conventional mouse, for example, requires a user's hand to be placed in a horizontal, pronated position. However, some embodiments of the invention may be configured to be inclined, allowing the forearm to rotate clockwise (i.e., supinate), which can reduce stress on the muscles (i.e., radial and ulnar muscles) holding the forearm bones (i.e., radius and ulna). Various ergonomic advantages of the various embodiments described herein are shown and described below with respect to FIGS. 6-8B.

Figure 6:
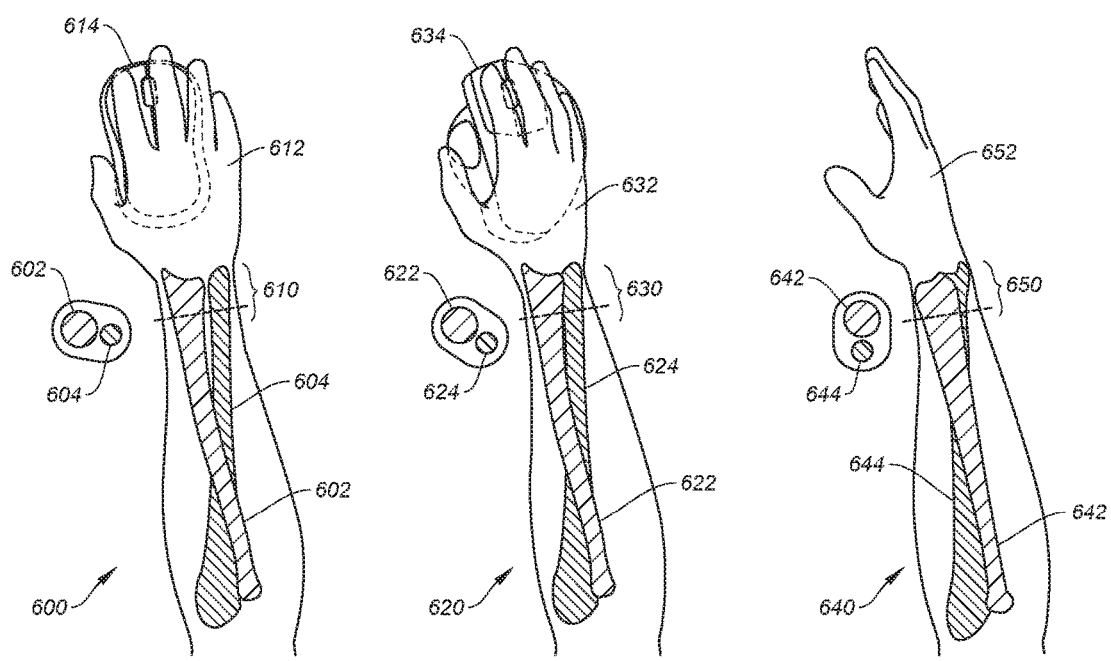
FIG. 6 shows various ergonomic aspects of different user wrist orientations.

FIG. 6 shows various ergonomic aspects of different user wrist orientations. User 600 is shown holding a typical computer mouse device 614 with a pronated hand 612. In this configuration, radius 602 and ulna 604 are pronated at the user's wrist 610 with a 0-10 degree angle with respect to the underlying work surface. This orientation may be satisfactory for extended use, but can be susceptible to RSI.

User 620 is shown holding an input device 634 with the user's hand 632 (e.g., similar to input device 100, 300, 400) in an inclined configuration, according to certain embodiments. In this configuration, radius 622 and ulna 624 are less pronated (i.e., more supinated towards a neutral orientation) at the user's wrist 630 with a 20-50 degree angle with respect to the underlying work surface. This orientation may be very satisfactory for extended use, and can be less susceptible to RSI than convention mice.

User 640 is shown holding their hand 652 in a neutral configuration, as one would have while performing a hand shake. In this configuration, radius 642 and ulna 644 are neutral (e.g., halfway between fully pronated and fully supinated) at the user's wrist 650 with a 50-90 degree angle with respect to the underlying work surface. This orientation may be optimal and even less susceptible to RSIs, but is typically not as practical for computer input devices. However, certain embodiments may include planar surface areas that are greater than 20 degrees from the underlying work surface, and some may 30-40 degrees or more. One of ordinary skill in the art would understand the many variations, modifications, and alternative embodiments thereof.

Figure 7A:
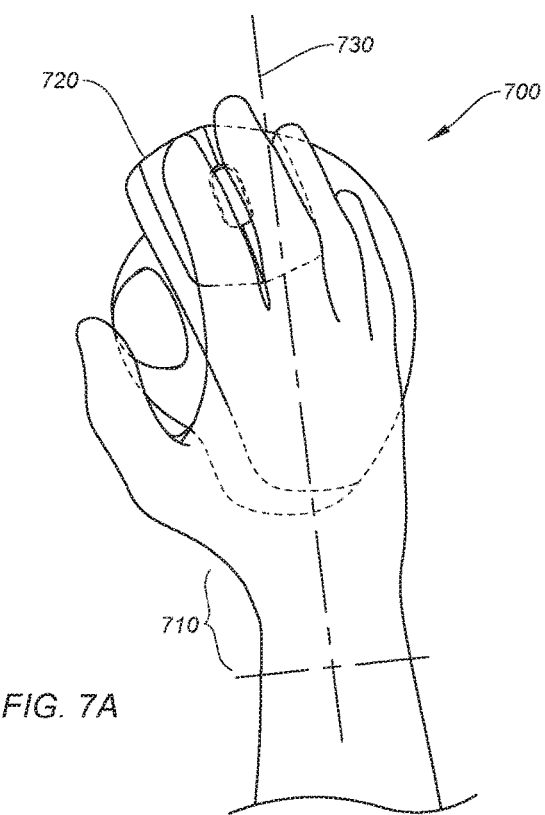
FIG. 7A shows an ergonomically designed input device that maintains proper wrist alignment, according to certain embodiments.
Figure 7B:
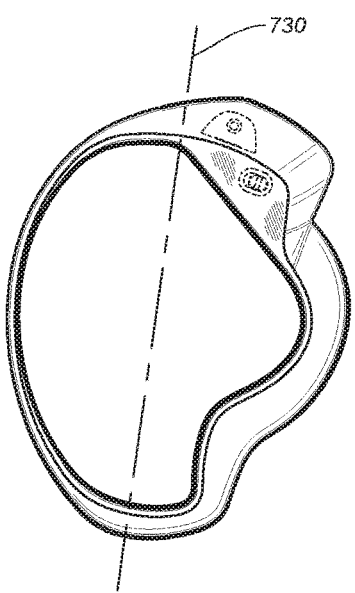
FIG. 7B shows an ergonomically designed input device that maintains proper wrist alignment, according to certain embodiments.

In addition to configuring an input device to place a user's hand in more of a neutral position, other ergonomic improvements can be made to reduce strain on the aforementioned muscles. For instance, keeping the hand aligned with the forearm can further reduce the possibility of RSIs. FIGS. 7A and 7B show an ergonomically designed input device 720 that maintains proper wrist alignment, according to certain embodiments. FIG. 7A shows a top view of user 700's hand engaging input device 720, and FIG. 7B shows a bottom view of the same input device 720. When engaging input device 720, user 700's wrist 710 is aligned (e.g., parallel) with spine 730, which is the pivot point between the neutral and inclined operational configurations discussed above (see, e.g., FIG. 3-4B). The alignment between wrist 710 and spine 730 places the user's hand in a more neutral configuration with respect to the forearm, thereby improving ergonomic function, reducing wrist pressure, and reducing potential RSI events. In further embodiments, spine 730 and a scroll wheel may be linearly offset by 12-14 degrees for an improved comfort and feel and reduced stress on the user's thumb.

Typically, five key muscles are used while moving a conventional mouse or trackball device, and each can be involved in potential injuries (e.g., epicondylitis). The less they work, the more relaxed and comfortable the user may be. Those muscles can include the upper trapezius, the extensor carpi, flexor carpi ulnaris, thumb abductor, and thumb adductor.

Figure 8A:
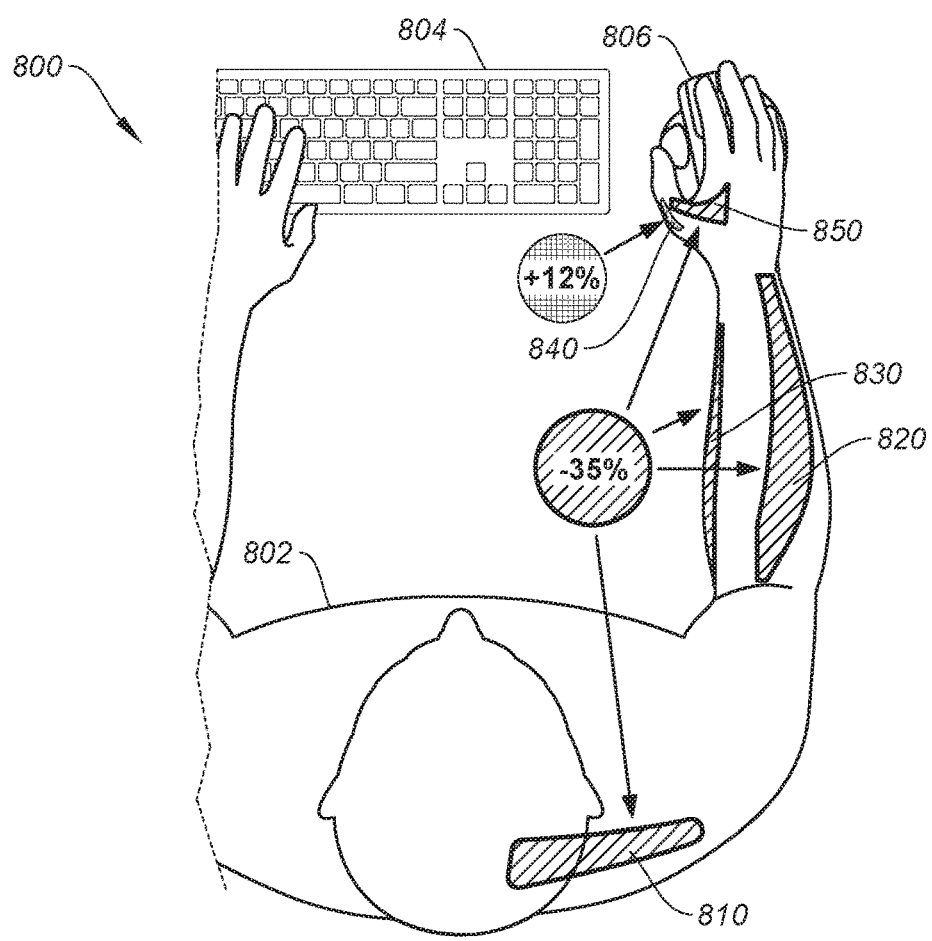
FIG. 8A shows various ergonomic benefits of using an inclined trackball input device at a work station, according to certain embodiments.

FIG. 8A shows various ergonomic benefits of using an inclined trackball input device at a work station 800, according to certain embodiments. FIG. 8A includes a user 802 operating keyboard 804 and input device 806 (e.g., an inclined trackball device, as shown in FIGS. 3-4B). Various muscles are shown including upper trapezius 810, extensor carpi 820, flexor carpi ulnaris 830, thumb abductor 840, and thumb adductor 850. Using an inclined trackball device (e.g., as shown in FIGS. 3-4B) over a conventional mouse (e.g., having a zero degree incline with respect to an underlying work surface) may yield significant reductions in muscle fatigue and resultant RSIs. As shown in FIG. 8A, as much as a 35% reduction in muscle activity can occur for the upper trapezius 810, extensor carpi 820, flexor carpi ulnaris 830, and thumb adductor 850, and wrist and hand position may be improved by as much as 50%. However, in certain cases, some increase in thumb abductor 840 usage may occur as the thumb is typically more engaged in a trackball device than in a conventional mouse.

Figure 8B:
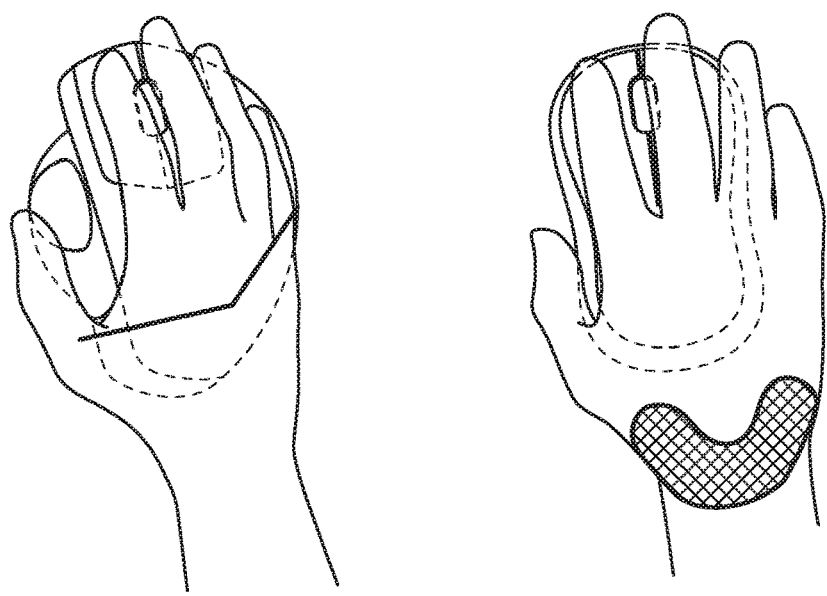
FIG. 8B shows how an inclined track ball controller causes most of the pressure to be shifted to the palm and off of the wrist.

While using a conventional mouse, a user's wrist may sit on the work surface for hours on end. Over time, this pressure can lead to pain, and in some cases to Carpal Tunnel Syndrome, a repetitive strain injury. One solution to avoid this pain is to remove the pressure on the wrist as much as possible. Trackball designs (according to certain embodiments) offer a good solution to this problem as they are ergonomically sculpted and use a static base (only the thumb is moving) to allow the wrist to be relaxed and at rest. FIG. 8B shows how an inclined track ball controller causes most of the pressure to be shifted to the palm with very little on the wrist. In contrast, most of the pressure (shown as the cross-hatched pattern) may be on the wrist in conventional mouse designs.

Figure 9:
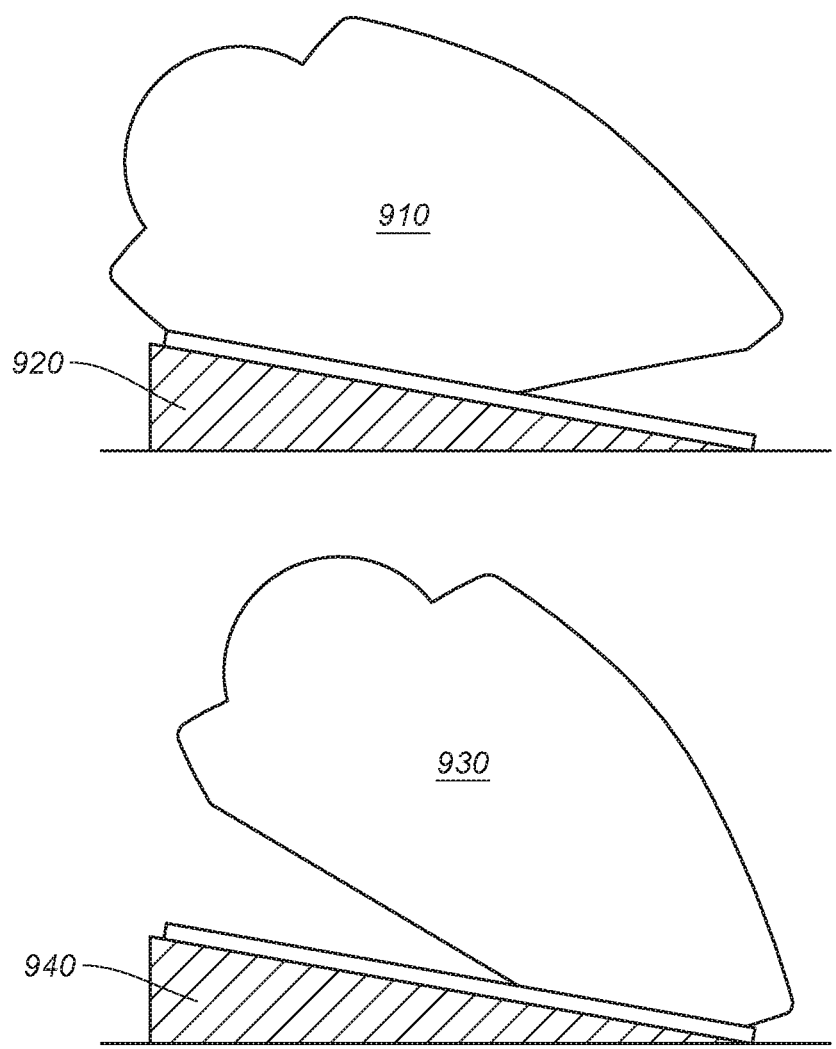
FIG. 9 shows how a wedge can be used to increase an amount of incline of an input device with respect to a work surface, according to certain embodiments.

FIG. 9 shows how a wedge can be used to increase an amount of incline of an input device with respect to a work surface, according to certain embodiments. In the upper figure, a wedge 920 can be placed underneath input device 910, shown in a zero degree neutral configuration, to increase its incline by 10 degrees for a total of 10 degrees with respect to the underlying surface. Similarly, in the lower figure, a wedge 940 can be placed underneath input device 930, shown in a twenty degree inclined configuration, to increase its incline by 10 degrees for a total of 30 degrees with respect to the underlying surface. Different wedges having different angles can be used. A wedge can be frictionally or adhesively coupled to the bottom of input devices 910, 930 (or any of the embodiments described through this document). Wedges can be comprised of a metal, rubber, plastic, or other suitable compound. One of ordinary skill in the art would understand the many variations, modifications, and alternative embodiments thereof.

Typical System Environment

Figure 10:
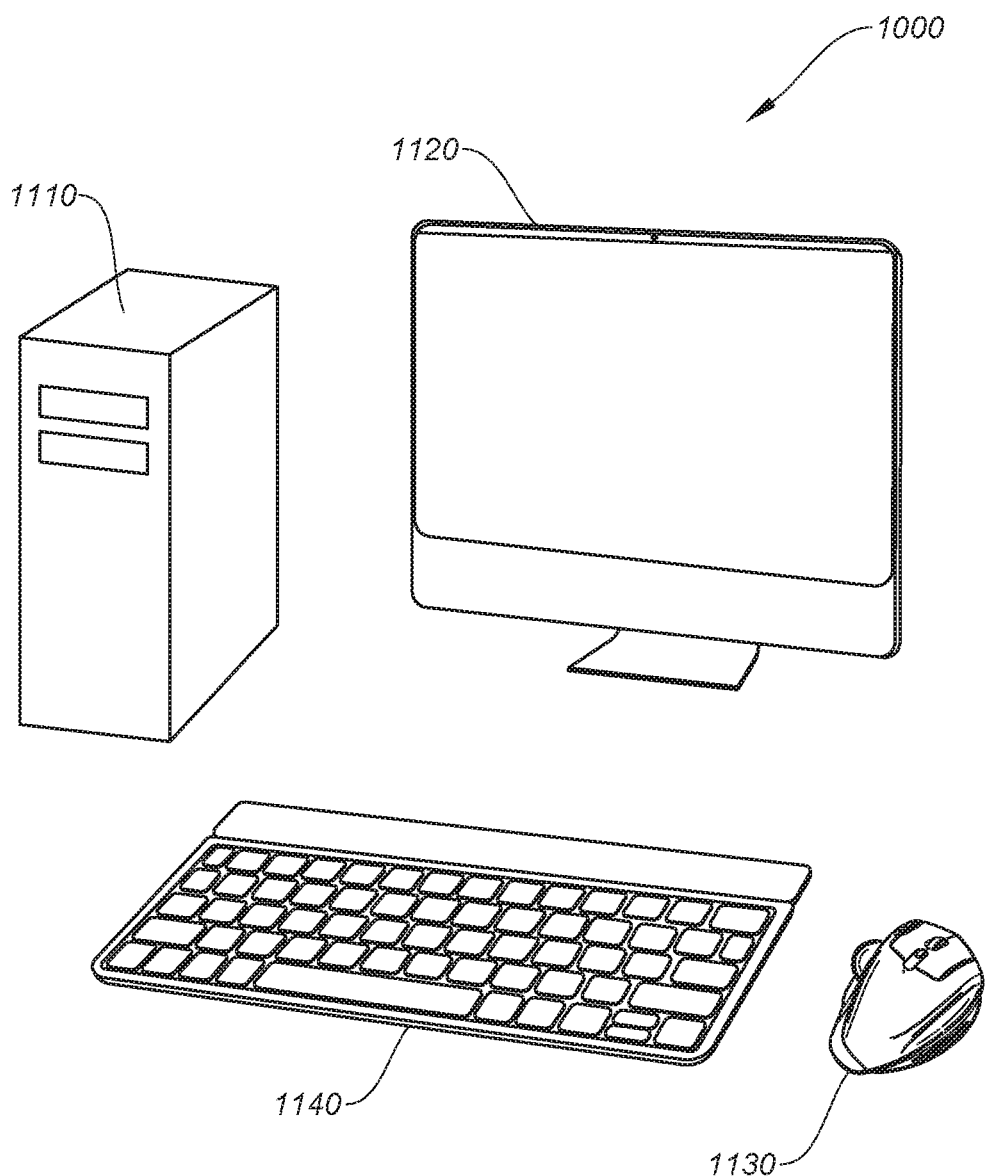
FIG. 10 is a simplified diagram of a computer system that incorporates an input device, according to certain embodiments

FIG. 10 is a simplified diagram of a computer system 1000 that incorporates an input device, according to certain embodiments. Computer system 1000 can include computer 1010, monitor 1020, input device 1030, and keyboard 1040.

In some embodiments, input device 1030 can be a computer mouse, a trackball (as shown), a remote control device, a game controller (e.g., game pad, joystick, game controller, etc.), a mobile device, or any other suitable device that can be used to convert analog inputs into digital signals for computer processing. For computer system 1000, input device 1030 can be configured to control various aspects of computer 1010 and monitor 1020.

Computer 1010 can be any suitable computing device including, but not limited to, a desktop computer, a laptop computer, a tablet or "phablet" computer, a smart phone, a PDA, a wearable devices (e.g., smart watches, smart glasses), or the like. In some embodiments, input device 1030 can be configured to provide control signals for movement tracking (e.g., x-y movement on a planar surface, three-dimensional "in-air" movements, etc.), touch and/or gesture detection, lift detection, orientation detection, power management capabilities, input detection (e.g., buttons, scroll wheels, etc.), output functions (e.g., LED control, haptic feedback, etc.), or any of a myriad of additional features that would be understood by one of ordinary skill in the art. Computer 1010 may include a machine readable medium (not shown) that is configured to store computer code, such as mouse driver software, where the computer code is executable by a processor (see, e.g., processor 210) of computer 1010 to control aspects of computer 1010 via input device 1030 and/or keyboard 1040. The various embodiments described herein generally refer to input device 1030 as a computer mouse or similar input device, however it should be understood that input device 1030 can be any suitable input/output (I/O) device (e.g., user interface device, control device, input unit, or the like) that may be adapted to utilize the novel embodiments described and/or contemplated herein.

In some embodiments, software operating on a host computing device (computer 1010) may include various enhancements to improve the user experience (UX) when using an input device (e.g., trackball device 1030), as described herein. For instance, UX software operating on computer 1010 may inform a user when they spend a certain amount of time (e.g., 5 hours) in one particular configuration (e.g., 0 degrees—see, e.g., FIG. 4A) and recommend that they switch to the second configuration (e.g., 20 degrees—see, e.g., FIG. 4B). In some cases, the software may remind a user (by displaying a message on a display) how much time the user has spent in one configuration and/or the other. An accelerometer and/or gyroscope (see, e.g., movement tracking block 230 of FIG. 2) can be used to determine a current configuration, although other methods of determining a present configuration are possible (e.g., pressure sensor(s), switches, etc.), as would be understood by one of ordinary skill in the art.

Software corresponding to the UX aspects discussed above incorporating various features of the present invention may be encoded and stored on various computer readable storage media; suitable media include magnetic disk or tape, optical storage media such as compact disk (CD) or DVD (digital versatile disk), flash memory, and other non-transitory media (e.g., stored in computer 1010). (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium). One of ordinary skill in the art would understand the many variations, modifications, and alternative embodiments thereof to incorporate the UX software described above and operate the system environment that incorporates the various novel input devices described throughout the present disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer mouse comprising:
a housing having a bottom surface;
a platform coupled to the bottom surface of the housing; and
a trackball disposed in the housing,
wherein the bottom surface of the housing includes:
a first planar region;
a second planar region; and
a spine both common to and dividing the first and second planar regions,
wherein the first and second planar regions are on different planes,
wherein, when in operation, the platform of the computer mouse is configured to rest on a work surface,
wherein when the computer mouse is configured such that the first planar region of the bottom surface is parallel to the work surface, the first planar region rests on and is flush against a first portion of the platform and the computer mouse is tilted at a first angle relative to the work surface, and
wherein when the computer mouse is configured such that the second planar region of the bottom surface is parallel to the work surface, the second planar region rests on and is flush against a second portion of the platform and the computer mouse is tilted at a second angle relative to the work surface, wherein the platform remains on the work surface as the computer mouse pivots on the spine between the first angle and second angle relative to the work surface.

2. The computer mouse of claim 1 wherein when the computer mouse is configured such that the first planar region of the bottom surface is parallel to the work surface, the computer mouse is tilted at zero degrees relative to the work surface, and
wherein when the computer mouse is configured such that the second planar region of the bottom surface is parallel to the work surface, the computer mouse is tilted at 20-30 degrees relative to the work surface.

3. The computer mouse of claim 1 further comprising:
a first set of magnets disposed in the first planar region of the housing; and
a second set of magnets disposed in the second planar region of the housing,
wherein the platform is comprised of a metal, and
wherein the platform is secured to the first planar region according to a first magnetic force provided by the first set of magnets when the computer mouse is at the first angle relative to the work surface, and
wherein the platform is secured to the second planar region according to a second magnetic force provided by the second set of magnets when the computer mouse is at the second angle relative to the work surface.

4. The computer mouse of claim 3 further comprising:
a third set of magnets disposed in the first portion of the platform, the third set of magnets to magnetically couple to the first set of magnets when the computer mouse is at the first angle relative to the work surface; and
a fourth set of magnets disposed in the second portion of the platform, the fourth set of magnets to magnetically couple to the second set of magnets when the computer mouse is at the second angle relative to the work surface.

5. The computer mouse of claim 4 further comprising a coupling guide disposed along the spine of the bottom surface, the coupling guide to receive a protrusion extending from the platform,
wherein the coupling guide remains coupled to the protrusion of the platform as the computer mouse pivots on the spine between the first angle and second angle relative to the work surface.

6. The computer mouse of claim 4 further comprising a hinge disposed along the spine of the bottom surface and hingeably coupled to the platform,
wherein the platform remains hingeably coupled to the platform as the computer mouse pivots on the spine between the first angle and second angle relative to the work surface.

7. The computer mouse of claim 1 further comprising a scroll wheel, wherein the spine and the scroll wheel are linearly offset by 12-14 degrees.

8. The computer mouse of claim 1 wherein the spine is configured to be linearly aligned to a user's forearm when the user is using the computer mouse.

9. A computer mouse comprising:
a housing having a bottom surface; and
a platform coupled to the bottom surface of the housing, the platform configured to rest on a work surface,
wherein the bottom surface of the housing includes:
   a first planar region;
   a second planar region; and
   a spine both common to and dividing the first and second planar regions,
   wherein the first and second planar regions are on different planes,
   wherein, when in operation, the platform is configured to rest on a work surface,
wherein when the computer mouse is configured such that the first planar region of the bottom surface is parallel to the work surface, the first planar region rests on and is flush against a first portion of the platform and the computer mouse is tilted at a first angle relative to the work surface,
wherein when the computer mouse is configured such that the second planar region of the bottom surface is parallel to the work surface, the second planar region rests on and is flush against a second portion of the platform and the computer mouse is tilted at a second angle relative to the work surface, and
wherein the spine is configured to be linearly aligned a user's forearm when the user is using the computer mouse, wherein the platform remains on the work surface as the computer mouse pivots on the spine between the first angle and second angle relative to the work surface.

10. The computer mouse of claim 9 wherein when the computer mouse is configured such that the first planar region of the bottom surface is parallel to the work surface, the computer mouse is tilted at zero degrees relative to the work surface, and
wherein when the computer mouse is configured such that the second planar region of the bottom surface is parallel to the work surface, the computer mouse is tilted at 20-30 degrees relative to the work surface.

11. The computer mouse of claim 9 further comprising:
a first set of magnets disposed in the first planar region of the housing; and
a second set of magnets disposed in the second planar region of the housing,
wherein the platform is comprised of a metal, and
wherein the platform is secured to the first planar region according to a first magnetic force provided by the first set of magnets when the computer mouse is at the first angle relative to the work surface, and
wherein the platform is secured to the second planar region according to a second magnetic force provided by the second set of magnets when the computer mouse is at the second angle relative to the work surface.

12. The computer mouse of claim 9 further comprising a trackball.

13. The computer mouse of claim 9 further comprising a scroll wheel, wherein the spine and the scroll wheel are linearly offset by 12-14 degrees.

14. A computer mouse comprising:
a housing having a bottom surface; and
a platform coupled to the bottom surface of the housing, the platform configured to rest on a work surface, and the platform including a first portion and a second portion,
wherein the bottom surface of the housing includes:
   a first planar region;
   a second planar region; and
   a spine both common to and dividing the first and second planar regions,
   wherein the first and second planar regions are on different planes,
   wherein when the computer mouse is configured such that the first planar region of the bottom surface is parallel to the work surface, the computer mouse is tilted at a first angle relative to the work surface and the first planar region rests on and is flush against the first portion of the platform,
wherein when the computer mouse is configured such that the second planar region of the bottom surface is parallel to the work surface, the computer mouse is tilted at a second angle relative to the work surface and the second planar region rests on and is flush against the second portion of the platform, and
wherein the platform remains on the work surface as the computer mouse pivots on the spine between the first angle and second angle relative to the work surface.

15. The computer mouse of claim 14 wherein when the computer mouse is configured such that the first planar region of the bottom surface is parallel to the work surface, the computer mouse is tilted at zero degrees relative to the work surface, and
wherein when the computer mouse is configured such that the second planar region of the bottom surface is parallel to the work surface, the computer mouse is tilted at 20-30 degrees relative to the work surface.

16. The computer mouse of claim 14 further comprising:
a first set of magnets disposed in the first planar region of the housing; and
a second set of magnets disposed in the second planar region of the housing,
wherein the platform is comprised of a metal, and
wherein the platform is secured to the first planar region according to a first magnetic force provided by the first set of magnets when the computer mouse is at the first angle relative to the work surface, and
wherein the platform is secured to the second planar region according to a second magnetic force provided by the second set of magnets when the computer mouse is at the second angle relative to the work surface.

17. The computer mouse of claim 14 further comprising a coupling guide disposed along the spine of the bottom surface, the coupling guide to receive a portion of the platform,
wherein the platform remains coupled to the portion of the platform as the computer mouse pivots on the spine between the first angle and second angle relative to the work surface.

18. The computer mouse of claim 14 further comprising a track ball.

* * * * *